United States Patent [19]

Chaconas

[11] Patent Number: 4,690,024
[45] Date of Patent: Sep. 1, 1987

[54] SAW BLADE AND TIP THEREFOR

[75] Inventor: Peter C. Chaconas, Glyndon, Md.

[73] Assignee: Black & Decker Inc., Newark, Del.

[21] Appl. No.: 706,523

[22] Filed: Feb. 28, 1985

[51] Int. Cl.$^4$ .......................... B27B 33/08; B27B 33/12
[52] U.S. Cl. ........................................ 83/852; 83/835; 76/112
[58] Field of Search ............... 83/852, 835, 840–845, 83/853; 76/112

[56] References Cited

U.S. PATENT DOCUMENTS

| | | |
|---|---|---|
| 71,625 | 12/1867 | Krauser . |
| 239,098 | 3/1881 | Hill . |
| 303,787 | 8/1884 | Arnold . |
| 326,798 | 9/1885 | Smith .............................. 83/840 X |
| 328,164 | 10/1885 | Wheeler . |
| 391,843 | 10/1888 | Gray ................................. 83/852 |
| 552,370 | 12/1895 | Holley . |
| 571,955 | 11/1896 | Phillips . |
| 1,837,344 | 12/1931 | Stauder .............................. 76/112 |
| 2,600,272 | 6/1952 | Segal . |
| 2,659,397 | 11/1953 | Drake ............................... 83/852 |
| 2,671,947 | 3/1954 | VanderLinde . |
| 2,880,768 | 4/1959 | Kolesh . |
| 2,964,078 | 12/1960 | Proctor . |
| 3,288,180 | 11/1966 | McLean et al. . |
| 3,372,719 | 3/1968 | Shone ............................... 83/841 |
| 3,374,815 | 3/1968 | Anderson, Jr. et al. . |
| 3,406,729 | 10/1968 | Cooper . |
| 3,519,039 | 7/1970 | Ehlen . |
| 3,528,465 | 9/1970 | Omley ............................... 83/842 |
| 3,986,421 | 10/1976 | Schultz . |
| 4,078,457 | 3/1978 | Schultz ............................. 76/112 |
| 4,102,231 | 7/1978 | Jagers . |
| 4,214,499 | 7/1980 | Ellis ............................... 83/835 |

FOREIGN PATENT DOCUMENTS

| | | |
|---|---|---|
| 1947295 | 3/1971 | Fed. Rep. of Germany . |
| 1652756 | 4/1971 | Fed. Rep. of Germany . |
| 1094943 | 12/1954 | France . |
| 1151382 | 5/1969 | United Kingdom . |
| 1579010 | 11/1980 | United Kingdom . |

Primary Examiner—Frank T. Yost
Attorney, Agent, or Firm—J. Bruce Hoofnagle; Edward D. Murphy; Dennis A. Dearing

[57] ABSTRACT

A circular saw blade (20) includes a circular body (22) with a plurality of equally spaced teeth (32) and a corresponding plurality of gullets (34) formed integrally with and about the periphery of the body. Each alternate tooth (32) of a first set of alternating teeth has mounted thereon a carbide tip (36) with a cutting point (60) on the right side of the blade (20). Each of the remaining teeth (32) form a second set of alternating teeth and has mounted thereon a carbide tip (38) with a cutting point 72 on the left side of the blade (20). Each of the carbide tips (36) and (38) is formed with a converse front face (42), top bevel angle, side clearance angles and a front bevel angle.

45 Claims, 13 Drawing Figures

SAW BLADE AND TIP THEREFOR

BACKGROUND OF THE INVENTION

This invention relates to a saw blade and to a tip therefor and particularly relates to a circular saw blade and a carbide tip having a concave rake face.

Circular saws using blades having carbide tips have been in use for many years and have provided significant advantages over hardened steel blades. For example, it is known that circular saws using blades with carbide tips may be operated at much higher cutting speeds while retaining a cutting sharpness for a relatively longer period. This provides for a much greater operating efficiency with significantly improved results.

However, due to the inherently brittle nature of carbide tips, the rake angle utilized heretofore has been in a range of zero to 20 degrees. In addition, while the rake face may be angled from side to side, the rake face typically has been flat and has provided generally uniform thickness of the tip. With a tip of generally uniform thickness supported and secured in an accommodating notch of tooth of the blade, the tip was thus positioned to be subjected to generally harmless compressive forces during use of the blade. This arrangement avoided, for the most part, the subjecting of the tip to undesirable shearing stresses which have a tendency to break the carbide tip.

Consequently, in order to avoid the potential for breaking carbide tips of a circular saw blade, the rake face has been flat and the rake angle typically has been limited to a range of zero 20 degrees as noted above. While the carbide tip for circular saw blades has brought many significant advantages to the circular saw blade users, the brittless factor heretofore has imposed significant limtations in performance.

In addition, when using a carbide tip formed with a flat rake face, the chips resulting from the cutting of the work piece, tend to flow down the flat or straight surface of the tip. The chips then must exit from the area of the tip by being worked between the body of the saw blade and the work piece. This creates an undesirable interference in the working area of the saw with resultant inefficiencies.

In at least one past teaching, teeth are formed integrally with the blade with each tooth being formed with a generally curved rake face from top to bottom. The curved face provides more rake to the cutting edge. The structure also provides a freer discharge of the debris.

In another past teaching, a carbide tip is used with a chain saw and is formed with a concave cutting face. The tip is formed with slots and a side surface to firmly seat the tip onto a supporting chain link of the saw. The tip straddles and extends considerably from each side of the link. Further, the tip extends a considerable distance from the concave cutting face to the rear of the tip apparently to provide substantial bulk behind the concave surface and thereby avoid breaking of the brittle carbide tip. The tip-supporting link is concave in the area immediately in front of the concave face of the tip.

In the cutting action of the chain saw, the concave face of the tip is fed in a linear direction into engagement with the workpiece whereby the tip is supported firmly by the bulk thereof and the link shoulder. Even though the cutting face of the tip is concave, the linear feed of the tip into the workpiece apparently results in the tip being subjected mainly to harmless compressive forces and few shear forces. By comparison, a circular saw blade is moved in a curvilinear direction into engagement with the workpiece whereby carbide tips are subjected to comparatively greater shear stress forces which have the tendency to break the brittle carbide tips.

Thus, in the circular saw industry, there is a need for a conventionally-mounted carbide tip having a curved or concave rake face profile to obtain the advantages of high rake angles currently not available with conventional state-of-the-art carbide tips used with circular saws.

In typical steel blade manufacture, integrally formed teeth are alternately spring set to produce a kerf width which is greater than the thickness of the body of the blade. This is obviously desirable to prevent any portion of the body of the blade from rubbing against and burning the workpiece and also to maintain the efficient operation of the circular saw.

In one teaching of a circular saw blade employing carbide tips, the teeth which support the tips are spring set alternately in the manner of the steel blade. Apparently, the carbide tips are not sprung in the blade mountings but are alternately moved to one side or the other of the plane of the blade body along with the spring set teeth.

In another teaching, carbide tips are mounted in a conventional manner on the blade body. Thereafter the sidewalls are ground inwardly on both sides from top to bottom. The top surface of the tip may then be bevelled downwardly from the side which includes the cutting point of the tip to the opposite side. The formation of the top bevel cooperates with the ground sides, theoretically to create a retracted non-cutting portion of the tip which is located on the side of the blade common with the cutting portions of the immediately adjacent tips. The retraction is typically about 0.001 inch to 0.002 inch and functions as a side clearance angle. Thus, the grinding of the side angles and the top bevel tends to provide a tip configuration necessary to obtain clearances to preclude the rubbing of non-cutting portions of the tips against the kerf wall of the workpiece and thereby to avoid the resultant deleterious effects.

However, from a practical standpoint, it is difficult to obtain and maintain the necessary parameters in assembling tips to blades and in the successive side and top bevel grinding of the assembled tips. For example, each tip ideally would have to be placed and secured perfectly on the blade in precisely the same relative location as the other tips on the blade. While the positioning of the tip is critical, there is also concern for any subsequent finishing operation, such as by grinding, which could alter the previous accurate positioning of the tip on the blade.

The grinding implements are typically set to angularly grind precise amounts of material from each side and top of the mounted tip assuming that the tip has been properly positioned. If the tip is tilted or set too far to one side of the blade, the subsequent side grinding and top bevelling operations will not accomplish the necessary result. Further, as the grinding implements and the supporting structure therefor become worn or shift in their mountings, the results of subsequent grinding operations are affected and the tips are not finished with the necessary parameters to provide the designed clearances.

Under these conditions, the non-cutting tops and edges of some tips of a given blade will extend laterally beyond the cutting point of at least the preceding tip. This creates a shear width which is wider than the designed shear width where the extended tops and sides actually and undesirably cut into the workpiece. This action also creates a drag in the operation of the blade with attendant inefficiencies.

Thus, there is a need in the circular saw industry for a carbide tip having a profile which will provide the necessary retraction clearance for obtaining the designed kerf width in an efficient manner. Further, there is a need for a carbide tip profile which will accommodate tolerances required in normal high speed production methods employed in the manufacture of circular saw blades.

In summary, the current state-of-the-art carbide tips used with circular saw blades present a myriad of problems and limitations as noted above. Ideally, these problems and limitations could be minimized by a single carbide tip having a profile which would provide relatively larger rake angles and adequate side clearance. Therefore, in addition to the need for a variety of designs of carbide tips to overcome each of the different problems and limitations noted above, there is also a need for a single design of a carbide tip which has a profile for overcoming all of the above-noted problems and limitations.

SUMMARY OF THE INVENTION

In accordance with the teachings of the present invention, a tip for a saw blade includes a tip body having a front face, a top face and first and second side faces. The front face and the top face are contiguous along a common edge which extends from the first side face toward the second side face. The front face is formed with a concave surface of a prescribed curvature which extends inwardly of the tip body from the common edge. The top face is formed with a prescribed bevel angle which extends inwardly of the tip body from the first side of the tip body toward the second side. A cutting edge is formed by the portion of the common edge which extends from the first side toward the second side and which slopes inwardly of the tip body from the first side to form a front bevel angle determined by the confluence of the prescribed curvature of the concave surface of the front face and the prescribed bevel angle of the top face.

In accordance with further teachings of the present invention, a circular saw blade includes a circular body having a plurality of teeth spaced equally around the periphery thereof and also having a left side and a right side relative to a cutting direction of movement of the saw blade. Each alternate tooth of the plurality of teeth forms a first set of alternating teeth and each of the remaining teeth of the plurality of teeth forms a second set of alternating teeth. Each of the plurality of teeth has a tip body secured thereto. Each of the tip bodies is formed with a front face, which faces in the cutting direction. Also, each of the tip bodies is formed with a top face. First and second side faces are formed on each of the tip bodies of the first set of alternating teeth with the first side face being on the right side of the circular body and the second side face being on the left side of the circular body. First and second side faces are also formed on each of the tip bodies of the second set of alternating teeth with the first side face being on the left side of the circular body and the second side face being on the right side of the circular body.

The front face and top face of each of the tip bodies are contiguous along a common edge which extends from the first side toward the second side of the tip body. The front face of each of the tip bodies is formed with a concave surface of a prescribed curvature which extends inwardly of the tip body from the common edge. The top face of each of the tip bodies is formed with a prescribed bevel angle which extends inwardly of the tip body from the first side to the second side thereof. A cutting edge is formed on each of the tip bodies by the portion of the common edge which extends from the first side toward the second side of the tip body. The cutting edge slopes inwardly of the tip body from the first side of the tip body to form a front bevel angle determined by the confluence of the prescribed curvature of the concave surface of the front face and the prescribed bevel angle of the top face.

DETAILED DESCRIPTION

Figure 1:
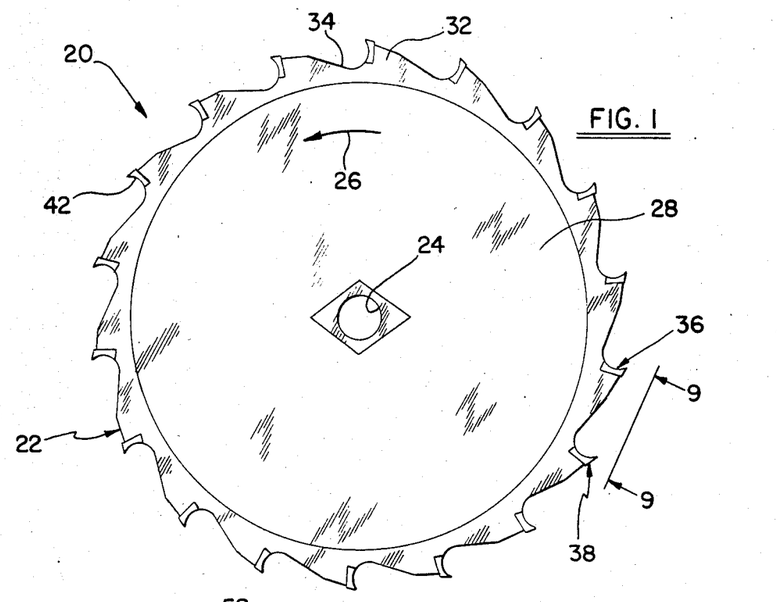
FIG. 1 is a side view showing a circular saw blade with carbide tips embodying certain principles of the invention.
Figure 2:
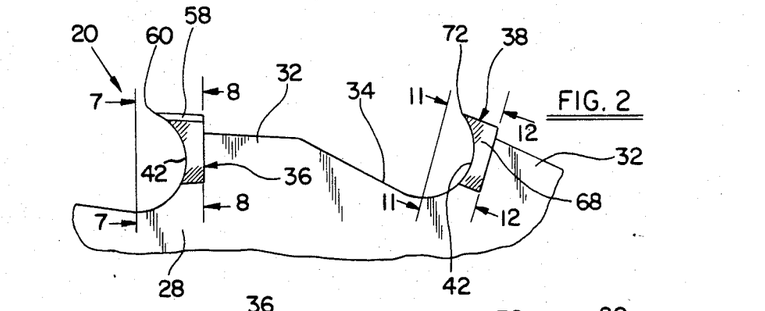
FIG. 2 is an enlarged partial side view of the circular saw blade of FIG. 1 showing details of two adjacent carbide tips of the saw blade.
Figure 3:
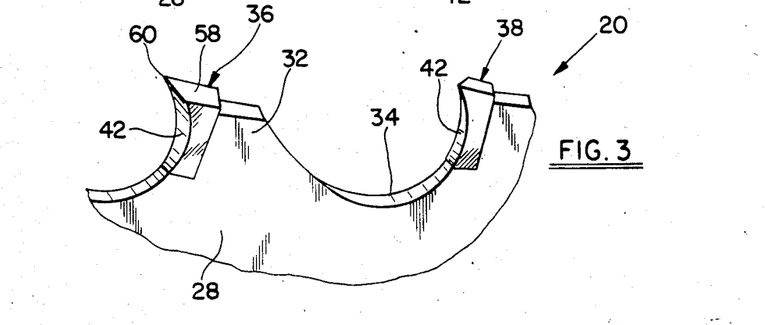
FIG. 3 is a perspective view of the enlarged partial view of FIG. 2 showing additional details of the two carbide tips of the saw blade.

Referring to FIGS. 1, 2 and 3, a circular saw blade 20 is formed with a disc-like circular body 22 and a central opening 24 (FIG. 1) to facilitate the mounting of the saw blade on a spindle of a drive mechanism (not shown). As viewed in FIG. 1, an arrow 26 represents the cutting direction of travel of blade 20 which is formed with a left side 28 and a right side 30 (FIG. 7) relative to the cutting direction of travel.

A plurality of equally spaced teeth 32 and a corresponding plurality of gullets 34 are formed integrally with and about the periphery of the body 22 with the gullets being interspersed between the teeth. Each gullet 34 is formed with a concave surface which faces outwardly from the periphery of the body 22 and is located, in the cutting direction, forward of the associated tooth 32.

Alternate teeth 32 of the plurality of teeth form a first set of alternating teeth. Each tooth 32 of the first set has mounted thereon a tip body such as a right side carbide tip 36. Each of the remaining teeth 32, which form a second set of alternating teeth, have mounted thereon a tip body such as left side carbide tip 38. Each of the tips 36 and 38 are secured, by welding or brazing, in a forward portion of the respective tooth 32. In the preferred embodiment of the invention, the tips 36 and 38 are composed of tungsten carbide but could be composed of other hard materials such as, for example, cobalt-steel alloy without departing from the spirit and scope of the invention.

Figure 4:
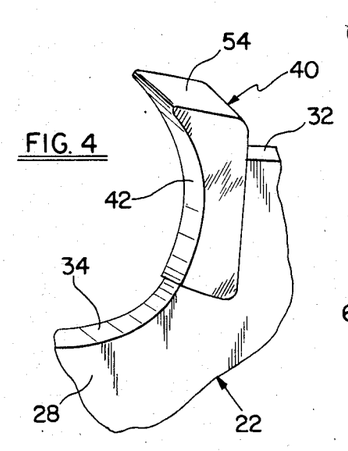
FIG. 4 is a perspective view of a single standard unground carbide tip assembled with the circular saw blade in preparation for a grinding operation to form the tips shown in FIGS. 1, 2 and 3.
Figure 5:
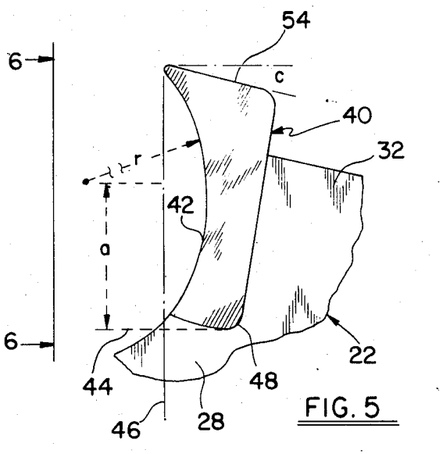
FIG. 5 is an enlarged partial side view showing the unground tip of FIG. 4 mounted on the blade.
Figure 6:
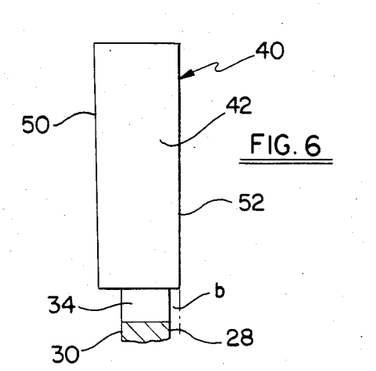
FIG. 6 is a front view taken along line 6—6 of FIG. 5 showing a front face of the unground tip.

Referring to FIGS. 4, 5 and 6, the carbide tips 36 and 38 are formed from sintered carbide blanks 40. Each blank 40 is manufactured with a concave front face 42 which ultimately becomes the rake or front face of the carbide tips 36 and 38.

Referring to FIG. 5, the curvature of front face 42 of blank 40 is determined by a radius dimension "r." The center point of radius dimension "r" is located a distance "a" measured perpendicularly from a line 44 which is perpendicular to blade centerline 46 and coincidental with inner back edge 48 of blank 40.

In the preferred embodiment, each of the blanks 40 is formed with a uniform thickness from one side 50 to the other side 52 (FIG. 6) thereof and is about twice as thick as body 22 of saw blade 20. Further, top surface 54 (FIGS. 4 and 5) of each blank 40 is formed with a top angle during the manufacture of the blank.

As shown in FIGS. 4 and 5, each of the blanks 40 is secured in the forward portion of the respective tooth 32 and, as shown in FIG. 6, is offset relative to the plane of the blade 20.

As secured in tooth 32, side 52 of blank 40 overhangs the left side 28 of the blade 20 by distance "b". The blank 40, as illustrated in FIG. 6, depicts the assembly arrangement of the blank in preparation for the ultimate formation of the right side carbide tip 36 with a cutting point located on the right side 30 of blade 20. For the left side carbide tip 38, the blank 40 would be assembled on the blade 20 so that side 50 of the blank overhangs the blade by distance "b." Referring to FIG. 5, as the blank 40 is set and secured in the forward portion of the respective tooth 32, the top surface 54 assumes a position relative to blade centerline 46 to provide a rearwardly sloping angle "c" which ultimately forms the top clearance angle for the carbide tips 36 and 38.

Figure 7:
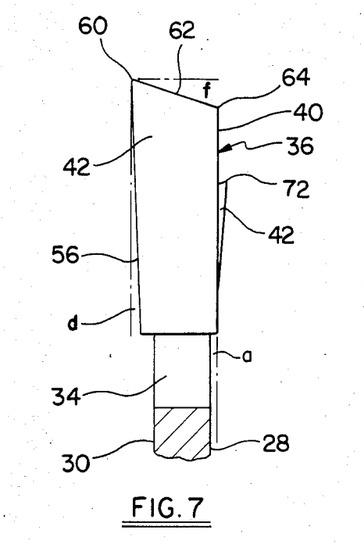
FIG. 7 is a view taken along line 7—7 of FIG. 2 showing the front face of one carbide tip.
Figure 8:
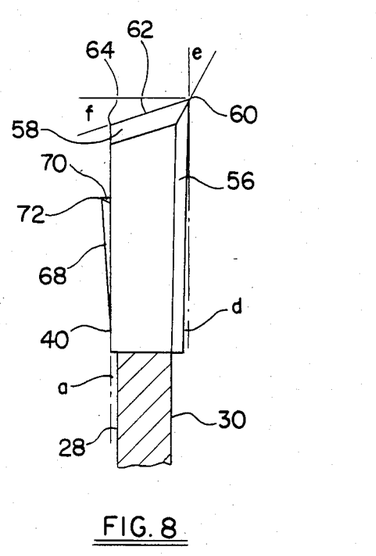
FIG. 8 is a view taken along line 8—8 of FIG. 2 showing a rear elevation of the tip of FIG. 5.
Figure 9:
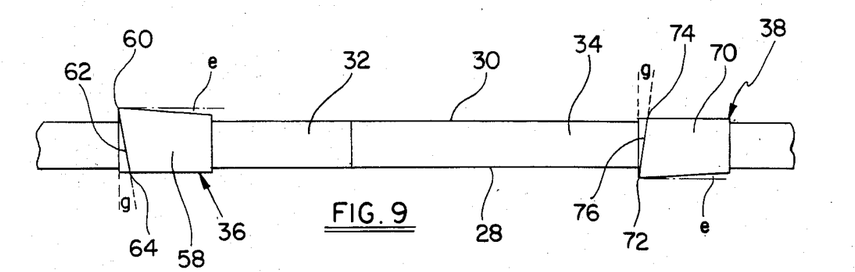
FIG. 9 is a view taken along line 9—9 of FIG. 1 showing the tops of adjacent carbide tips of the circular saw blade.

After each tooth 32 has a blank 40 secured thereto, the blade 20 is mounted in a grinding facility (not shown) to process the blade through a grinding operation to form the carbide tips 36 and 38. During the grinding operation, side 50 (FIG. 6) of blank 40 is ground to form a top-to-bottom side clearance angle "d" as illustrated in FIGS. 7 and 8. In addition, side 50 is also ground to form a front-to-back side clearance angle "e" as illustrated in FIGS. 8 and 9. Thus, side 50 of blank 40 is formed with compound angles for right side carbide tip 36 to form double angle side face 56 as illustrated in FIG. 8.

Thereafter, top surface 54 (FIGS. 4 and 5) of blank 40 is gound to form a top bevel angle "f" which slopes inwardly of blank 40 and downwardly from left to right, as viewed in FIG. 7, and right-to-left, as viewed in FIG. 8. As noted above, top surface 54 of blank 40 is initially manufactured to form top clearance angle "c", as illustrated in FIG. 5. Therefore, after the grinding operation, the top surface 54 is formed with compound angles "c" and "f", to form double angle top face 58 as illustrated in FIG. 8. By forming the top bevel angle "f", an edge is formed which is common to front face 42 and top face 58 whereby the front and top faces are placed in a contiguous relationship.

During the formation of top bevel angle "f", a grinding wheel (not shown) grinds the top surface 54 inwardly of blank 40 from left to right as viewed in FIG. 7. This grinding operation results in the forming of a cutting point 60 and a cutting edge 62 which extends along at least a portion of the common edge formed between front face 42 and top face 58. As the grinding wheel angles inwardly of the blank 40 during the grinding operation, and moves toward side 40, the wheel grinds successive inward portions of the concave surface of front face 42. In this manner, the common edge, which includes cutting edge 62, is formed from cutting point 60, across the concave surface of front face 42 to a trailing point 64 at side 40. The cutting edge 62 not only angles downwardly by angle "f", as viewed in FIG. 7, but also angles inwardly or rearwardly of blank 40 to form a front bevel angle "g", as viewed in FIG. 9. Thus, the front bevel angle "g" is formed during the formation of the top bevel angle "f" and is directly related to and determined by the confluence of the curvature of the concave surface of front face 42 and the size of top bevel angle "f" of top face 54.

Figure 10:
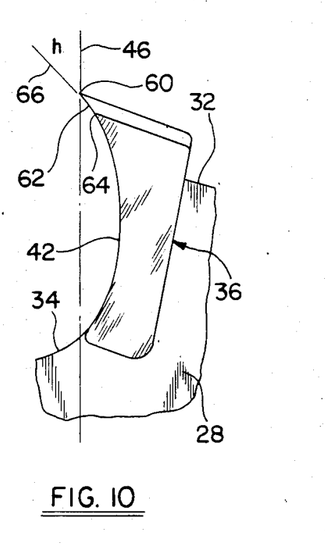
FIG. 10 is an enlarged partial side view of the tip of FIG. 7 showing a rake angle.

As illustrated in FIGS. 2 and 10, the radially outward portions of tips 36 and 38 extend radially beyond the periphery of body 22 of saw blade 20. This considerable extension provides for the formation of the top bevel at angle "f" on the top surface 54 of blank 40 (FIGS. 4 and 5) to form top face 58 of tip 36 without undesirably machining or otherwise engaging the periphery of teeth 32 which represents the periphery of body 22 of saw blade 20. Further, even after initially forming top face 58, tips 36 extend radially well beyond the periphery of body 22 of saw blade 20 to permit subsequent resharpening of the tips. Tips 38 also extend radially in the same fashion to provide the same advantages as described above with respect to tips 36.

As illustrated in FIG. 10, a rake angle "h" of carbide tip 36 is established by the curvature of the concave surface of front face 42 at the time blank 40 is manufactured. Rake angle "h" is determined by an acute angle formed by blade centerline 46, which passes through cutting point 60, and a line 66 which extends tangentially from the curvature of the concave surface at cutting point 60.

As noted, the rake angle "h" is coincidental with the cutting point 60. Also, the cutting edge 62 rakes or angles down the concave surface of front face 42, as viewed in FIG. 7, to the trailing point 64. Due to this downward raking, successively lower rake angles are formed at successive points along the cutting edge 62 between the cutting point 60 and the trailing point 64. This results in the largest rake angle "h" being formed at the cutting point 60 and the smallest rake angle being formed at the trailing point 64. As the rake angles become progressively smaller, the curvature of the concave surface of front face 42 progressively approaches, but never reaches, a straight face relative to centerline 46 (FIG. 10). In this manner, high rake angle "h" is supported by trailing portions of the concave surface which develop the progressively smaller rake angles. Thus, the carbide tip breakage problem experienced in the past is minimized by use of the curved design of front face 42.

Figure 11:
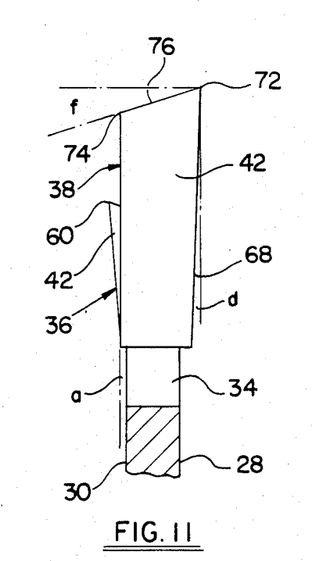
FIG. 11 is a view taken along line 11—11 of FIG. 2 showing the front face of the next adjacent trailing carbide tip from the carbide tip of FIG. 7.

As illustrated in FIGS. 7 and 11, the width dimension or thickness of each tip 36 and 38, as viewed at front face 42 from the radially inward end of the tip to the radially outward end, is wider than the thickness or width of body 22 of saw blade 20.

While the preferred embodiment of the invention is formed with the illustrated concave surface on front face 42 during the manufacture of blank 40, other curved designs could be formed on the front face without departing from the spirit and scope of the invention. For example, blank 40 could be manufactured with a partially conical curved surface of front face 42 which would ultimately provide a partially conical curved surface of tip 36. With the conical design, the cutting edge would rake rearwardly from the cutting point side to the other side of the tip by virtue of the manufactured conical surface edge.

Figure 12:
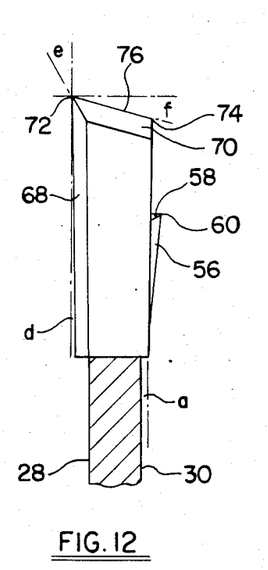
FIG. 12 is a view taken along line 12—12 of FIG. 2 showing a rear elevation of the tip of FIG. 11.

Referring to FIGS. 11 and 12, the left side carbide tip 38 is formed in the same manner as tip 36. As illustrated, tip 38 is formed with front face 42, side face 68, top face 70 (FIG. 12), cutting point 72, trailing point 74 and cutting edge 76. In addition, carbide tip 38 is formed with the same dimensions and angles noted above for tip 36.

As illustrated in FIGS. 1, 2, 3 and 10, the curvature of the portion of gullet 34, which is adjacent to the front face 42 of each tip 36 and 38, is the same curvature as the concave surface of the front face. This arrangement presents a continuous concavity of a prescribed curvature which extends from the cutting edges 62 and 76 well into the gullets 34.

In essence then, gullet 34 extends from cutting edges 62 and 76 and follows the prescribed curvature from the cutting edges well into the portion of the gullet formed by the body 22 of saw blade 20. By virtue of the tips 36 and 38 being composed of tungsten carbide, the portion of each of gullets 34 which is formed by the tips is thereby lined with a hardened long-wearing material.

As illustrated in FIGS. 2, 3 and 10, the concave surface of front face 42 of each of tips 36 and 38 presents a circular face with an arc center position such that the uppermost and lowermost portions of the tip form a cradle to carry cut chips from the workpiece. This feature reduces the possibility of cut chips becoming wedged between the body 22 of the saw blade 20 and the workpiece. In addition, it appears that the concave design of front face 42 enhances chip ejection by a flow of air in a centripetal motion across the front face. The apparent rush of air which develops as the tip exits from the workpiece blows the chips from the cradle and allows centrifugal force to escort the chips from the vacinity of the periphery of blade 20.

Each of the carbide tips 36 and 38 advantageously uses a higher-than-normal cutting rake angle "h". Typically, carbide tips have rake angles in the zero to twenty degrees range to minimize the succeptibility of tip breakage due to brittleness of the carbide material. As noted above, the breakage problem is minimized in tips 36 and 38 by the concave surface design of front face 42 which provides the relatively higher rake angle "h" at the cutting point 60 with the progressively smaller rake angles immediately supporting the higher rake angle "h" and the cutting edge 62. This illustrates one advantage of the curved design of front face 42.

Another advantage of the concave faced carbide tips 36 and 38 relates to the formation of the front bevel angle. As the top bevel angle is formed, the front bevel angle is simultaneously formed by virtue of the curvature of the front face 42. This eliminates a grinding operation which normally would be required to form the front bevel angle. In addition, as the top bevel angle is formed, the grinding wheel cuts lower into the concave surface of the front face 42 which results in a rearward raking of cutting edges 62 and 76. The result is an extremely sharp cutting edge which generates a "knife" slicing action for reduced power requirements and a superior finish.

Figure 13:
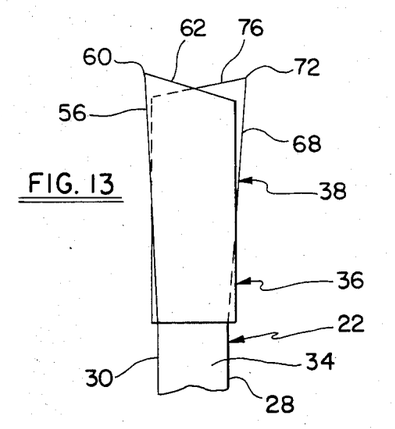
FIG. 13 is a front view representation showing two tips in alignment for the purpose of illustration.

As illustrated in FIG. 13, an alternate tip relief is provided by double angle side faces 56 and 68. The clearances provided by faces 56 and 68 of alternate tips 36 and 38, respectively, remove the potential for drag which could be caused by non-cutting portions of the tips engaging the workpiece. The alternate tip relief thereby allows more generous manufacturing tolerances without loss in performance of the saw blade 20.

Thus, the carbide tips 36 and 38 and the circular saw blade 20 embodied in the invention, and as described above, produces faster, more efficient chip removal for a faster and smoother cutting accompanied by less heat buildup and greater cutting accuracy.

Obviously, many modifications may be made without departing from the basic spirit of the present invention. Accordingly, it will be appreciated by those skilled in the art that within the scope of the appended claims, the invention may be practiced other than as has been specifically described herein.

I claim:

1. A tip for a saw blade having a gullet formed integrally with the blade, which comprises:
   a one-piece tip body for assembly with the saw blade immediately adjacent the integrally formed gullet;
   the tip body being composed of a hardened long-wearing material;
   a front face formed on the tip body extending from a first-end edge of the front face to a second-end edge thereof;
   a top face formed on the tip body;
   a first side and a second side formed on the tip body on opposite sides of the front face and contiguous therewith;
   the front face and the top face being contiguous along a common edge coincidental with the first-end edge of the front face and which extends from the first side of the tip body toward a second side of the tip body;
   the front face being formed with a curved surface contiguous with the common edge and extending from the common edge over the entire front face to the second-end edge thereof which is positionable adjacent the gullet integrally formed with the saw blade; and
   a cutting edge formed by the portion of the common edge which extends from a the first side of the tip body toward the second side of the tip body.

2. A tip for a saw blade, which comprises:
   a tip body;
   a front face formed on the tip body;
   a top face formed on the tip body;
   a first side and a second side formed on the tip body on opposite sides of the front face and contiguous therewith;

the front face and the top face being contiguous along
a common edge which extends from the first side of
the tip body toward a second side of the tip body;
the front face being formed with a concave surface of
a prescribed curvature which extends inwardly of
the tip body from the common edge;
the top face being formed with a prescribed bevel
angle which extends inwardly of the tip body from
the first side of the tip body toward the second side
of the tip body;
a cutting edge formed by the portion of the common
edge which extends from the first side of the tip
body toward the second side of the tip body and
which slopes inwardly of the tip body from the first
side of the tip body and downwardly along the
front face of the tip body;
the prescribed curvature of the concave surface developing a prescribed rake angle at the portion of
the front face which is contiguous with the cutting
edge and the first side of the tip body; and
the curvature of the concave surface along the remaining portions of the cutting edge developing
rake angles which are progressively smaller than
the prescribed rake angle.

3. A tip for a saw blade having a gullet formed with a prescribed curvature, which comprises:
a tip body composed of a hardened long-wearing material;
a front face formed on the tip body;
a top face formed on the tip body;
a first side and a second side formed on the tip body on opposite sides of the front face and contiguous therewith;
the front face and the top face being contiguous along a common edge which extends from the first side of the tip body toward a second side of the tip body;
the front face being formed with a concave surface of the same prescribed curvature as the gullet of the saw blade and which extends inwardly of the tip body from the common edge;
the top face being formed with a prescribed bevel angle which extends inwardly of the tip body from the first side of the tip body toward the second side of the tip body; and
a cutting edge formed by the portion of the common edge which extends from the first side of the tip body toward the second side of the tip body and which slopes inwardly of the tip body from the first side of the tip body to form a front bevel angle determined by the confluence of the prescribed curvature of the concave surface of the front face and the prescribed bevel angle of the top face.

4. The tip as set forth in claim 3, which further comprises:
a cutting point formed at the juncture of the front face, the top face and the first side of the tip body.

5. The tip as set forth in claim 3, which further comprises:
the common edge extending from the first side of the tip body to the second side of the tip body to form a trailing point at the juncture of the front face, the top face and the second side of the tip body.

6. The tip as set forth in claim 3, which further comprises:
the first side of the tip body being formed with a prescribed side clearance angle which extends inwardly of the tip body from the front face.

7. The tip as set forth in claim 6, which further comprises:
the first side of the tip body being formed with a prescribed side clearance angle which extends inwardly of the tip body from the top face.

8. The tip as set forth in claim 3, which further comprises:
the first side of the tip body being formed with a prescribed side clearance angle which extends inwardly of the tip body from the top face.

9. The tip as set forth in claim 3, which further comprises:
the top surface of the tip body being formed with a prescribed top clearance angle which extends inwardly of the tip body from the common edge.

10. The tip as set forth in claim 3 wherein the hardened long-wearing material is tungsten carbide.

11. A carbide tip for a circular saw blade which is formed with a gullet having a prescribed curvature, which comprises:
a tip body;
an unmachined front face formed on the tip body;
a machined top face formed on the tip body;
a first side and a second side formed on the tip body on opposite sides of the front face and contiguous therewith;
the unmachined front face and the machined top face being contiguous along a common edge which extends from a first side of the tip body to a second side of the tip body;
the unmachined front face being formed with a concave surface of the same prescribed curvature as the gullet of the saw blade and which extends inwardly of the tip body from the common edge toward an intermediate portion of the tip body;
the machined top face being formed with a prescribed bevel angle which extends innwardly of the tip body from the first side of the tip body to the second side of the tip body;
a cutting point formed at the juncture of the unmachined front face, the machined top face and the first side of the tip body and at one end of the common edge;
a trailing point formed at the juncture of the unmachined front face, the machined top face and the second side of the tip body and at the other end of the common edge;
a cutting edge formed by the common edge and extending between the cutting point and the trailing point; the cutting edge sloping inwardly of the tip body from the first side to the second side to form a front bevel angle determined by the confluence of the prescribed curvature of the concave surface of the unmachined front face and the prescribed bevel angle of the machined top face;
the first side of the tip body being formed with a first prescribed side clearance angle which extends inwardly of the tip body from the front face and being formed with a second prescribed side clearance angle which extends inwardly of the tip body from the top face; and
the top surface being formed with a prescribed top clearance angle which extends inwardly of the top body from the cutting edge.

12. A circular saw blade, which comprises:
a circular body having a plurality of teeth spaced equally around the periphery thereof;

the circular body having a left side and a right side relative to a cutting direction of movement of the saw blade;

the circular body being formed integrally with a plurality of gullets corresponding in number to the plurality of teeth;

each of the plurality of teeth having a one-piece tip body secured thereto;

each tip body being composed of a hardened long-wearing material;

a front face formed on each of the tip bodies and facing in the cutting direction;

one end of the front face of each one-piece tip body being located adjacent to the respective gulley integrally formed with the circular body;

a top face formed on each of the tip bodies;

a first side and a second side formed on each of the tip bodies;

the front face and the top face of each of the tip bodies being contiguous along a common edge which extends from the first side of each of the tip bodies toward the second side of the tip body;

the front face of each of the tip bodies being formed with a curved surface contiguous with the common edge and extending in concave fashion from the common edge to the one end of the front face; and a cutting edge formed on each of the tip bodies by the portion of the common edge which extends from the first side of the tip body toward the second side of the tip body.

13. A circular saw blade, which comprises:

a circular body having a plurality of teeth spaced equally around the periphery thereof;

the circular body having a left side and a right side relative to a cutting direction of movement of the saw blade;

each alternate tooth of the plurality of teeth forming a first set of alternating teeth and each of the remaining teeth of the plurality of teeth forming a second set of alternating teeth;

each of the plurality of teeth having a tip body secured thereto;

a front face formed on each of the tip bodies and facing in the cutting direction;

a top face formed on each of the tip bodies;

a first side and a second side formed on each of the tip bodies of the first set of alternating teeth with the first side being on the right side of the circular body and the second side being on the left side of the circular body;

a first side and a second side formed on each of the tip bodies of the second set of alternating teeth with the first side being on the left side of the circular body and the second side being on the right side of the circular body;

the front face and the top face of each of the tip bodies being contiguous along a common edge which extends from the first side of each of the tip bodies toward the second side of the tip body;

the front face of each of the tip bodies being formed with a concave surface of a prescribed curvature which extends inwardly of the tip body from the common edge;

the top face of each of the tip bodies being formed with a prescribed bevel angle which extends inwardly of the tip body from the first side of the tip body to the second side of the tip body;

a cutting edge formed on each of the tip bodies by the portion of the common edge which extends from the first side of the tip body toward the second side of the tip body and which slopes inwardly of the tip body from the first side of the tip body and downwardly from the top face of the tip body;

the prescribed curvature of the concave surface developing a prescribed rake angle at the portion of the front face which is contiguous with the cutting edge and the first side of the tip body, and the curvature of the concave surface along the remaining portions of the cutting edge developing rake angles which are progressively smaller than the prescribed rake angle.

14. A circular saw blade, which comprises:

a circular body having a plurality of teeth spaced equally around the periphery thereof;

the circular body being formed with a plurality of gullets corresponding in number to the plurality of teeth; each of the plurality of gullets being formed with a concave surface in a prescribed curvature;

the circular body having a left side and a right side relative to a cutting direction of movement of the saw blade;

each alternate tooth of the plurality of teeth forming a first set of alternating teeth and each of the remaining teeth of the plurality of teeth forming a second set of alternating teeth;

each of the plurality of teeth having a tip body secured thereto;

the tip body being composed of a hardened long-wearing material;

a front face formed on each of the tip bodies and facing in the cutting direction;

a top face formed on each of the tip bodies;

a first side and a second side formed on each of the tip bodies of the first set of alternating teeth with the first side being on the right side of the circular body and the second side being on the left side of the circular body;

a first side and a second side formed on each of the tip bodies of the second set of alternating teeth with the first side being on the left side of the circular body and the second side being on the right side of the circular body;

the front face and the top face of each of the tip bodies being contiguous along a common edge which extends from the first side of each of the tip bodies toward the second side of the tip body;

the front face of each of the tip bodies being formed with a concave surface of the same prescribed curvature as the gullets and which extends inwardly of the tip body from the common edge;

the top face of each of the tip bodies being formed with a prescribed bevel angle which extends inwardly of the tip body from the first side of the tip body to the second side of the tip body; and a cutting edge formed on each of the tip bodies by the portion of the common edge which extends from the first side of the tip body toward the second side of the tip body and which slopes inwardly of the tip body from the first side of the tip body to form a front bevel angle determined by the confluence of the prescribed curvature of the concave surface of the front face and the prescribed bevel angle of the top face.

15. The circular saw blade as set forth in claim 14, which further comprises:

a cutting point formed on each of the tip bodies at the juncture of the front face, the top face and the first side of the tip body.

16. The circular saw blade as set forth in claim 15, wherein the cutting point of each of the tip bodies of the first set of alternating teeth appears on the left side of the circular body to form a left side cutting point and the cutting point of each of the tip bodies of the second set of alternating teeth appears on the right side of the circular body to form a right side cutting point.

17. The circular saw blade as set forth in claim 15, which further comprises the prescribed curvature of the concave surface developing a rake angle greater than twenty degrees at the cutting point of each tip body.

18. The circular saw blade as set forth in claim 14, which further comprises:
the common edge of each of the tip bodies extending from the first side of the tip body to the second side of the tip body to form a trailing point at the juncture of the front face, the top face and the second side of the tip body.

19. The circular saw blade as set forth in claim 14, which further comprises:
the first side of each of the tip bodies being formed with a prescribed side clearance angle which extends inwardly of the tip body from the front face.

20. The circular saw blade as set forth in claim 14, which further comprises:
the first side of each of the tip bodies being formed with a prescribed side clearance angle which extends inwardly of the tip body from the top face.

21. The circular saw blade as set forth in claim 19, which further comprises:
the first side of each of the tip bodies being formed with a prescribed side clearance angle which extends inwardly of the tip body from the top face.

22. The circular saw blade as set forth in claim 14, which further comprises:
the top surface of each of the tip bodies being formed with a prescribed top clearance angle which extends inwardly of the tip body from the common edge.

23. The circular saw blade as set forth in claim 14, wherein the hardened long-wearing material is tungsten carbide.

24. The circular saw blade as set forth in claim 14, which further comprises:
the second side face of each of the tip bodies located in a plane which is spaced from the adjacent side face of the circular body by a prescribed distance.

25. The circular saw blade as set forth in claim 14, wherein a rake angle of each of the cutting tips is determined by the acute angle formed between a centerline of the circular body passing through the cutting point of the tip body and another line passing through the cutting point and extending tangentially from the curvature of the concave surface of the front face.

26. The circular saw blade as set forth in claim 25 wherein the rake angle is a prescribed rake angle, and wherein progressively smaller rake angles are developed along the cutting edge toward the second side of the tip body.

27. The circular saw blades as set forth in claim 14, which further comprises:
the plurality of gullets, spaced equally around the periphery of the circular body and interspersed between the plurality of teeth;
the concave surface of each gullet faces outwardly from the periphery of the circular body and is located, in a cutting direction of the blade, forward of an associated one of the plurality of teeth;

28. A circular saw blade, which comprises:
a circular body;
a plurality of teeth formed in and spaced equally around the periphery of the body;
a plurality of cutting tips;
each of the plurality of cutting tips being secured to a respective tooth of the plurality of teeth;
each of the plurality of tips including a radially outer surface which faces in the same direction as the periphery of the body of the saw blade;
the radially outer surface of each of the plurality of tips being formed with a prescribed bevel angle which extends laterally of the tip;
each of the plurality of cutting tips being formed with a cutting edge facing in a cutting direction of the circular body and which extends in a direction laterally and inwardly of the tip and radially inwardly with respect to the body of the saw blade;
each of the plurality of cutting tips being formed with a curved face facing in the cutting direction which extends from the cutting edge radially inwardly of the body of the saw blade; and
each of the plurality of tips having a width dimension throughout its length from the radially inward end to the radially outward end which is greater than the width of the body of the saw blade.

29. A method of making a tip for a saw blade having a gullet formed integrally with the blade, which comprises the steps of:
forming a one-piece tip body composed of a hardened long-wearing material and having a top face, first and second sides and front face with the front face being formed with a concave surface of prescribed curvature extending from a first edge of the front face to a second edge thereof with the first and second edges being located at opposite ends of the front face; and
forming a bevel at a prescribed angle on the top face from the first side of the tip body toward the second side of the tip body to form a cutting edge coincidental with the first edge of the front face and contiguous with the front face and the top face and which slopes inwardly of the tip body from the first side to form a front bevel angle determined by the confluence of the prescribed curvature of the concave surface and the prescribed angle of the bevel of the top face.

30. The method of making the tip as set forth in claim 29, wherein the tip body having the top face, the first and second sides and the front face with the concave surface of prescribed curvature is formed by sintering.

31. The method of making the tip as set forth in claim 29, wherein the bevel on the top face is formed by a machining operation.

32. A method of making a circular saw blade, which comprises the steps of:
forming a circular body having a tooth located on the periphery thereof and an integrally formed gulley adjacent the tooth;
forming a one-piece tip body composed of a hardened long-wearing material and having a top face, first and second sides and a front face with the front face being formed with a concave surface of prescribed curvature extending from a first edge of the front face to a second edge thereof with the first and second edges being located at opposite ends of the front face;

securing the tip body in a forward portion of the tooth of the circular body with the concave surface of the front face of the tip body facing in a cutting direction of movement of the saw blade and with the second edge of the front face being immediately adjacent the gullet integrally formed in the circular body; and forming a bevel at a prescribed angle on the top face of the tip body from the first side toward the second side of the tip body to form a cutting edge coincidental with the first edge of the front face and contiguous with the front face and the top face and which slopes inwardly of the tip body from the first side to form a front bevel angle determined by the confluence of the prescribed curvature of the concave surface and the prescribed angle of the bevel of the top face.

33. The method of making circular saw blade as set forth in claim 32 wherein the tooth is a first tooth, the gullet is a first gullet and the tip body is a first tip body with the first side of the first tip body being on a right side of the circular body, and which further comprises the steps of:

forming a second tooth in the circular body located on the periphery thereof and a second integrally formed gullet adjacent the second tooth;

forming a second one-piece tip body identical in structure and composition to the first tip body;

securing the second one-piece tip body in a forward portion of the second tooth of the circular body with the concave surface of the front face of the second tip body facing in the cutting direction of movement of the saw blade and with the second edge of the front face of the second tip body being immediately adjacent the second gullet integrally formed in the circular body and where the first side of the second tip body is on the left side of the circular body; and forming a bevel at a prescribed angle on the top face of the second tip body from the first side of the second tip body to form a cutting edge contiguous with the front face and top face of the second tip body and which slopes inwardly of the second tip body from the first side toward the second side of the second tip body to form a front bevel angle determined by the confluence of the prescribed curvature of the concave surface and the prescribed angle of the bevel of the top face.

34. The method of making a circular saw blade as set forth in claim 33, which further comprises the step of:

forming cutting points on the first and second tip bodies at the juncture of the front face, the top face and the first side of each of the tip bodies.

35. A circular blade, which comprises:
a circular body;
a plurality of teeth formed in and spaced equally around the periphery of the body;
a plurality of cutting tips;
each of the plurality of cutting tips being secured to a respective tooth of the plurality of teeth;
each of the plurality of cutting tips being formed with a cutting edge facing in a cutting direction of the circular body and which extends in a direction laterally and inwardly of the tip and radially inwardly with respect to the body of the saw blade;
each of the plurality of cutting tips being formed with a curved face facing in the cutting direction which extends from the cutting edge radially inwardly of the body of the saw blade;
each of the plurality of tips having a width dimension throughout its length from the radially inward end to the radially outward end which is greater than the width of the body of the saw blade; and
each of the plurality of tips including a substantial portion extending in a direction radially beyond the periphery of the body of the saw blade.

36. A circular saw blade, which comprises:
a circular body;
a plurality of teeth formed in and spaced equally around the periphery of the body;
a plurality of cutting tips;
each of the plurality of cutting tips being secured to a respective tooth of the plurality of teeth;
each of the plurality of cutting tips being formed with a cutting edge facing in a cutting direction of the circular body and which extends in a direction laterally and inwardly of the tip and radially inwardly with respect to the body of the saw blade;
each of the plurality of cutting tips being formed with a curved face facing in the cutting direction which extends from the cutting edge radially inwardly of the body of the saw blade;
the curved face of each of the cutting tips being fully exposed in the cutting direction; and
each tip including a substantial portion extending in a direction radially beyond the periphery of the body of the saw blade.

37. The circular saw blade as set forth in claim 36 wherein the cutting edge of each of the plurality of tips is located radially beyond the periphery of the body of the saw blade.

38. The circular saw blade as set forth in claim 36, which further comprises the cutting edge of each of the plurality of tips including a cutting point at one end of the cutting edge which is located laterally beyond an adjacent side of the body of the saw blade.

39. The circular saw blade as set forth in claim 38, which further comprises:

each of the plurality of tips including a radially outer surface which faces in the same direction as the periphery of the body of the saw blade;

each of the plurality of tips including one side which is contiguous with the cutting point;

the radially outer surface of each of the plurality of tips being formed with a prescribed clearance angle which extends rearwardly of the tip from the cutting edge and with a bevel angle which extends laterally of the tip from the one side; and the one side of each of the plurality of tips being formed with a first prescribed side clearance angle which extends inward of the tip from the radially outer surface and with a second prescribed side clearance angle which extends from the curved face rearwardly of the tip.

40. The circular saw blade as set forth in claim 39, wherein each of the plurality of tips is composed of tunsten carbide.

41. A circular saw blade, which comprises:
a circular body;
a plurality of teeth formed in and spaced equally around the periphery of the body;
a plurality of cutting tips;

each of the plurality of cutting tips being secured to a respective tooth of the plurality of teeth;

each of the plurality of cutting tips being formed with a cutting edge facing in a cutting direction of the circular body and which extends in a direction laterally and inwardly of the tip and radially inwardly with respect to the body of the saw blade;

each of the plurality of tips being formed with a front face which faces in the cutting direction;

the circular body having a plurality of gullets, corresponding in number to the plurality of teeth, spaced equally around the periphery of the body and interspersed between the plurality of teeth;

the front face of the tip of each tooth and at least the adjacent portion of the respective gullet being arranged to form a continuous concave surface of a prescribed curvature extending from the cutting edge and into the adjacent portion of the gullet; and at least the portion of each continuous concave surface which extends from the cutting edge of the respective tip and is coincidental with the front face of the respective tip being lined with a hardened long-wearing material.

42. The circular saw blade as set forth in claim 41, wherein the hardened long-wearing material is tungsten carbide.

43. A circular saw blade, which comprises:
a circular body;
a plurality of teeth formed in and spaced equally around the periphery of the body;
a plurality of cutting tips;
each of the plurality of cutting tips being secured to a respective tooth of the plurality of teeth;
each of the plurality of cutting tips being formed with a cutting edge facing in a cutting direction of the circular body and which extends in a direction laterally and inwardly of the tip and radially inwardly with respect to the body of the saw blade;
each of the plurality of cutting tips being formed with a front face which faces in the cutting direction;
each of the plurality of tips having a width dimension throughout its length from the radially inward end to the radially outward end which is greater than the width of the body of the saw blade;
the circular body having a plurality of gullets spaced equally around the periphery of the body and interspersed between the plurality of teeth;
the front face of the tip of each tooth and at least the adjacent portion of the respective gullet being arranged to form a continuous concave surface of a prescribed curvature extending from the cutting edge and into the adjacent portion of the gullet; and
at least the portion of each continuous concave surface which extends from the cutting edge of the respective tip and is coincidental with the front face of the respective tip being lined with a hardened long-wearing material.

44. A circular saw blade, which comprises:
a circular body;
a plurality of teeth formed in and spaced equally around the periphery of the body;
a plurality of cutting tips;
each of the plurality of cutting tips being secured to a respective tooth of the plurality of teeth;
each of the plurality of cutting tips being formed with a cutting edge facing in a cutting direction of the circular body and which extends in a direction laterally and inwardly of the tip and radially inwardly with respect to the body of the saw blade;
each of the plurality of cutting tips being formed with a front face which faces in the cutting direction;
each of the plurality of tips including a substantial portion extending in a direction radially beyond the periphery of the body of the saw blade;
the circular body having a plurality of gullets spaced equally around the periphery of the body and interspersed between the plurality of teeth;
the front face of the tip of each tooth and at least the adjacent portion of the respective gullet being arranged to form a continuous concave surface of a prescribed curvature extending from the cutting edge and into the adjacent portion of the gullet; and
at least the portion of each continuous concave surface which extends from the cutting edge of the respective tip and is conincidental with the front face of the respective tip being lined with a hardened long-wearing material.

45. A circular saw blade, which comprises:
a circular body;
a plurality of teeth formed in and spaced equally around the periphery of the body;
a plurality of cutting tips;
each of the plurality of cutting tips being secured to a respective tooth of the plurality of teeth;
each of the plurality of cutting tips being formed with a cutting edge facing in a cutting direction of the circular body and which extends in a direction laterally and inwardly of the tip and radially inwardly with respect to the body of the saw blade;
each of the plurality of cutting tips being formed with a front face which faces in the cutting direction;
each of the plurality of tips having a width dimension throughout its length from the radially inward end to the radially outward end which is greater than the width of the body of the saw blade;
each of the plurality of tips including a substantial portion extending in a direction radially beyond the periphery of the body of the saw blade;
the circular body having a plurality of gullets spaced equally around the periphery of the body and interspersed between the plurality of teeth;
the front face of the tip of each tooth and at least the adjacent portion of the respective gullet being arranged to form a continuous concave surface of a prescribed curvature extending from the cutting edge and into the adjacent portion of the gullet; and
at least the portion of each continuous concave surface which extends from the cutting edge of the respective tip and is coincidental with the front face of the respective tip being lined with a hardened long-wearing material.

* * * * *

UNITED STATES PATENT AND TRADEMARK OFFICE
CERTIFICATE OF CORRECTION

PATENT NO. : 4,690,024

DATED : Sep. 1, 1987

INVENTOR(S) : Peter C. Chaconas

It is certified that error appears in the above-identified patent and that said Letters Patent is hereby corrected as shown below:

In the Abstract

Line 11, cancel "converse", insert --concave--.

In the Specification

Column 1, line 23, after "of" insert --a--;
　Column 1, line 32, after "zero" insert --to--;
　Column 1, line 35, cancel "brittless", insert --brittleness--;

In the Claims

Column 10, claim 7, line 1, cancel "6", insert --3--;
　Column 10, claim 8, line 6, cancel "3", insert --6--;
　Column 10, claim 11, line 37, cancel "innwardly",
　　insert --inwardly--;
　Column 11, claim 12, line 14, cancel "gulley",
　　insert --gullet--;
　Column 14, claim 27, line 4, cancel ";", insert --.--;
　Column 14, claim 29, line 36, after "sides and" insert "a";

Signed and Sealed this

Thirtieth Day of August, 1988

Attest:

DONALD J. QUIGG

Attesting Officer　　　　Commissioner of Patents and Trademarks